(12) United States Patent  
Hayashi et al.

(10) Patent No.: US 7,434,780 B2
(45) Date of Patent: Oct. 14, 2008

(54) PILOT-TYPE TWO-PORT VALVE

(75) Inventors: Bunya Hayashi, Tsukubamirai (JP);
Shinji Miyazoe, Tsukubamirai (JP);
Shinichi Yoshimura, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 308 days.

(21) Appl. No.: 11/478,731

(22) Filed: Jul. 3, 2006

(65) Prior Publication Data

US 2007/0007474 A1 Jan. 11, 2007

(30) Foreign Application Priority Data

Jul. 11, 2005 (JP) .............................. 2005-202081

(51) Int. Cl.
*F16K 31/12* (2006.01)
(52) U.S. Cl. .............................. 251/12; 251/54; 251/63; 251/63.6
(58) Field of Classification Search ................... 251/12, 251/48, 54, 55, 62, 63, 63.5, 63.6
See application file for complete search history.

(56) References Cited

U.S. PATENT DOCUMENTS 4,526,341 A * 7/1985 Thomas ...................... 251/63.5
6,491,059 B2 * 12/2002 Kajitani ...................... 137/530

6,854,705 B2 * 2/2005 Wieder ...................... 251/63.6

FOREIGN PATENT DOCUMENTS

JP      2001-193846      7/2001
JP      2004-316679      11/2004

OTHER PUBLICATIONS

U.S. Appl. No. 11/446,382, filed Jun. 5, 2006, Hayashi et al.
U.S. Appl. No. 11/478,731, filed Jul. 3, 2006, Hayashi et al.

* cited by examiner

*Primary Examiner*—John K Fristoe, Jr.
(74) *Attorney, Agent, or Firm*—Oblon, Spivak, McClelland, Maier & Neustadt, P.C.

(57) ABSTRACT

A pilot-type two-port valve is disclosed having a water hammer preventing mechanism, operative to prevent a water hammer during valve-closing operation, which includes a valve member operative to open or close a valve and a piston driven by pilot fluid for operating the valve member for opening and closing movements. The water hammer preventing mechanism comprises a piston drive chamber, from which fluid is discharged during valve-closing operation, which has an orifice for restricting the flow rate of discharge fluid whereby when the piston moves to a position to allow the valve member to be close to a valve seat, a portion of an discharge flow passage of the piston drive chamber is blocked to restrict the flow rate of the discharge fluid to the flow rate of fluid flowing through the orifice.

9 Claims, 7 Drawing Sheets

PILOT-TYPE TWO-PORT VALVE

TECHNICAL FIELD

The present invention relates to pilot-type two-port valves mounted in liquid flow passages for opening or closing the same and, more particularly, to a pilot-type two-port valve used in a liquid flow passage for coolant or the like for preventing water hammer resulting from the closing of a valve.

In the related art, a pilot-type two-port valve has been known, as disclosed in Japanese Unexamined Patent Application Publication No. 2001-193846, wherein a valve member, operative to be seated on or unseated from a valve seat disposed in a liquid flow passage, is moved in a valve-opening direction upon supply of pilot fluid to a pressure-acting chamber formed on one side of a piston to discharge pilot fluid for enabling the piston to move in a valve-closing direction due to an urging force of a coil spring.

With the pilot-type two-port valve of such a kind, the valve is closed at a relatively high speed and using such a two-port valve in a liquid flow passage remaining at a relatively high pressure results in the occurrence of a water hammer phenomenon during the closing of the valve. Thus, a need arises to take a simple means for stably preventing such a phenomenon.

DISCLOSURE OF INVENTION

The present invention has an object to address the issue of the pilot-type two-port valve, adapted to open or close the liquid flow passage, by using a simple means to enable the prevention of the water hammer occurring during valve-closing operation in a stable manner.

It is another object of the present invention to provide a pilot-type two-port valve arranged to restrict a discharge speed of pilot fluid for closing a valve to a lower value less than a supply speed of pilot fluid for opening valve for thereby effectively preventing a water hammer.

It is another object of the present invention to provide a pilot-type two-port valve arranged to enable the flow rate of discharging pilot fluid to be adjusted for thereby making it possible to adjust a speed of a valve member to close a liquid flow passage.

To address the above issues, the present invention provides a pilot-type two-port valve having a main valve mechanism including a first port and a second port serving as an inlet and an outlet for liquid, respectively, a valve seat formed in midstream of a main flow passage connected between both the ports, and a valve member operative to open or close the valve seat; and a valve drive mechanism including a piston, connected to the valve member via a rod, and first and second piston drive chambers formed on both sides of the pistons and operative such that supplying pilot fluid to or discharging the same from at least one of the first and second piston drive chambers allows the piston to operate for thereby opening or closing the valve member, wherein the two-port valve comprises a water hammer preventing mechanism operative to prevent the occurrence of water hammer resulting from the valve member closing the valve seat. The water hammer preventing mechanism has an orifice formed in the first piston drive chamber, from which fluid is discharged when the piston drives the valve member in a direction to close a valve, for limiting the flow rate of discharge fluid whereby when the valve member comes close to the valve set, the flow rate of the discharge fluid is restricted to the flow rate of fluid admitted through the orifice.

With the present invention, the water hammer preventing mechanism may comprise a one-way seal member mounted on the piston and operative such that when the piston moves to a position to allow the valve member to get close to the valve seat, the seal member blocks a portion of a flow path for the discharge fluid in a discharge direction to cause the discharge fluid to be discharged under a status where the flow rate of the discharge fluid is restricted.

In this case, the piston may have a damper chamber in fluid communication with the first piston drive chamber via a seal member and the orifice whereby when the piston moves to the position to allow the valve member to get close to the valve seat, the damper chamber is shut off from the first piston drive chamber due to the seal member and brought into fluid communication with the first piston drive chamber via the orifice.

More particularly, the piston may have a damper chamber in fluid communication with the first piston drive chamber via the seal member and the orifice and the damper chamber has an inner periphery on which the seal member, which is annular in shape, is disposed, and wherein a plate, blocking out one end of the first piston drive chamber, includes a columnar section operative to mate with the seal member, whereby when the piston moves to the position to allow the valve member to get close to the valve seat, the columnar section is brought into mating engagement with the seal member to cause the damper chamber to be shut off from the first piston drive chamber due to the seal member and brought into fluid communication with the first piston drive chamber via the orifice.

In this case, the piston may have an area formed with the orifice for bypassing the seal member and the columnar section may have an area formed with the orifice for bypassing the seal member, allowing the damper chamber and the first piston drive chamber to communicate with each other.

With another embodiment according to the present invention, the piston may have an outer periphery carrying thereon the seal member and the first piston drive chamber may have a sidewall having a plurality of areas formed with flow ports, operative to discharge fluid from the first piston drive chamber to an outside, one of which includes the orifice whereby when the piston moves to the position to allow the valve member to get close to the valve seat, the seal member shuts off the flow ports, except for the orifice, in the discharge direction.

With the two-port valve of a concrete embodiment according to the present invention, the first piston drive chamber may comprise a pressure chamber that is supplied with pilot fluid to drive the piston in a valve-opening direction and the second piston drive chamber accommodates therein a resilient member for restoring the piston to a valve closing position.

Thus, according to the present invention, a simplified mechanism can stably prevent water hammer from occurring during valve-closing operation. More particularly, the pilot-type two-port valve is arranged to limit a discharge speed of pilot fluid for the closing of a valve to a lower value less than a supply speed of pilot fluid for the opening of the valve whereby water hammer can be effectively prevented while making it possible to adjust the flow rate of pilot fluid being discharged to enable the adjustment of a speed of the valve member to close the liquid flow passage.

BEST MODE FRO CARRYING OUT THE INVETNION

Figure 1:
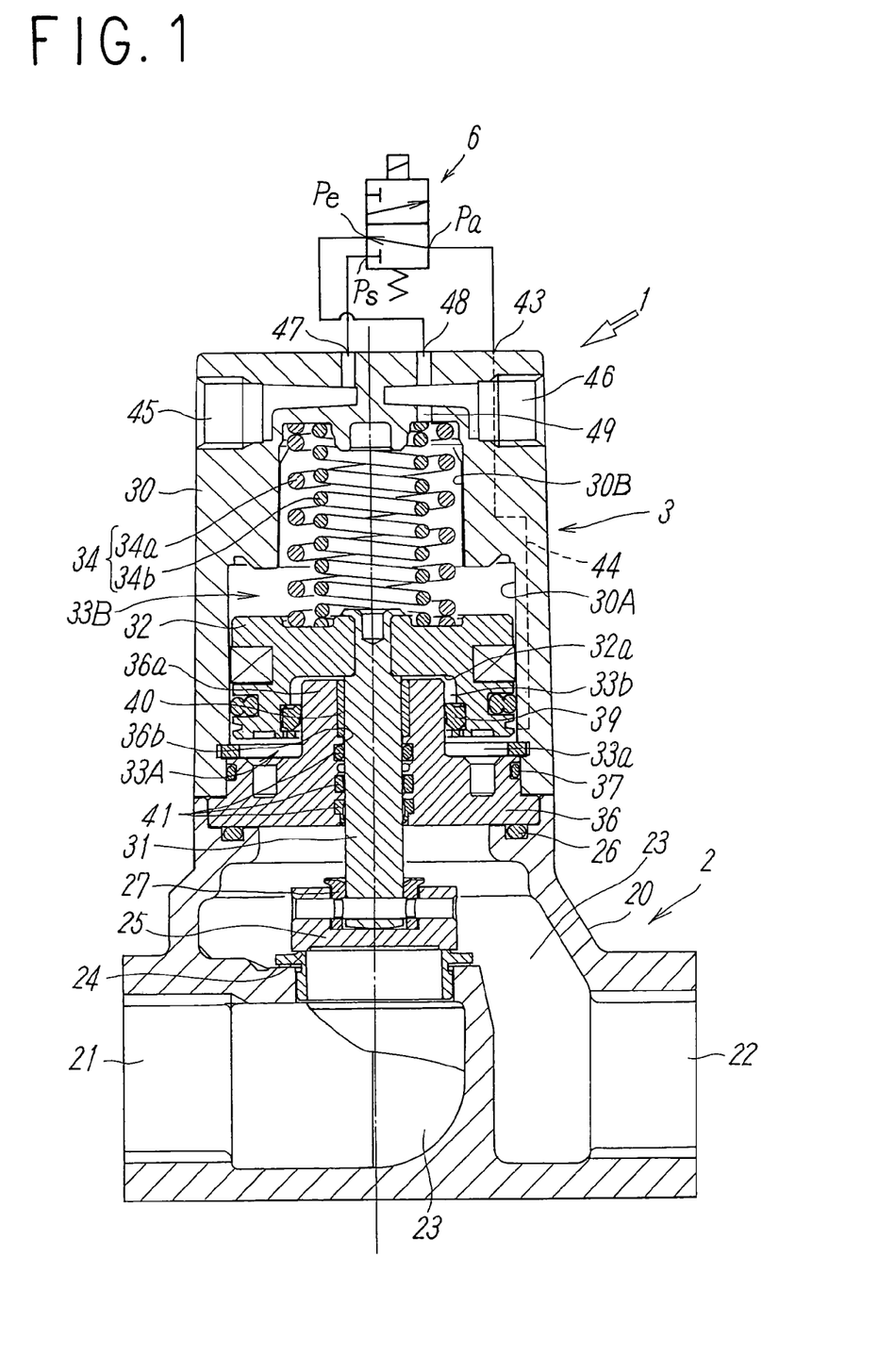
FIG. 1 is a longitudinal cross-sectional view showing a pilot-type two-port valve, remaining under a valve-closed state, of a first embodiment according to the present invention.
Figure 2:
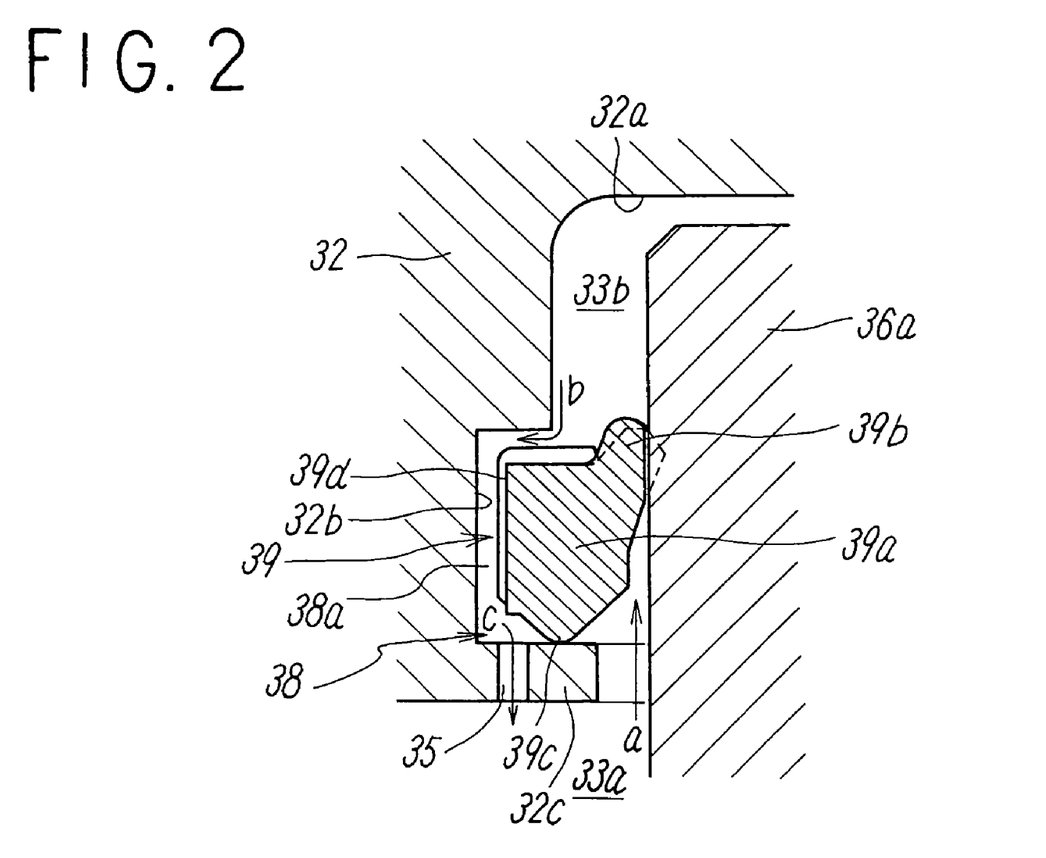
FIG. 2 is an enlarged cross-sectional view of a chief part shown in FIG. 1.
Figure 3:
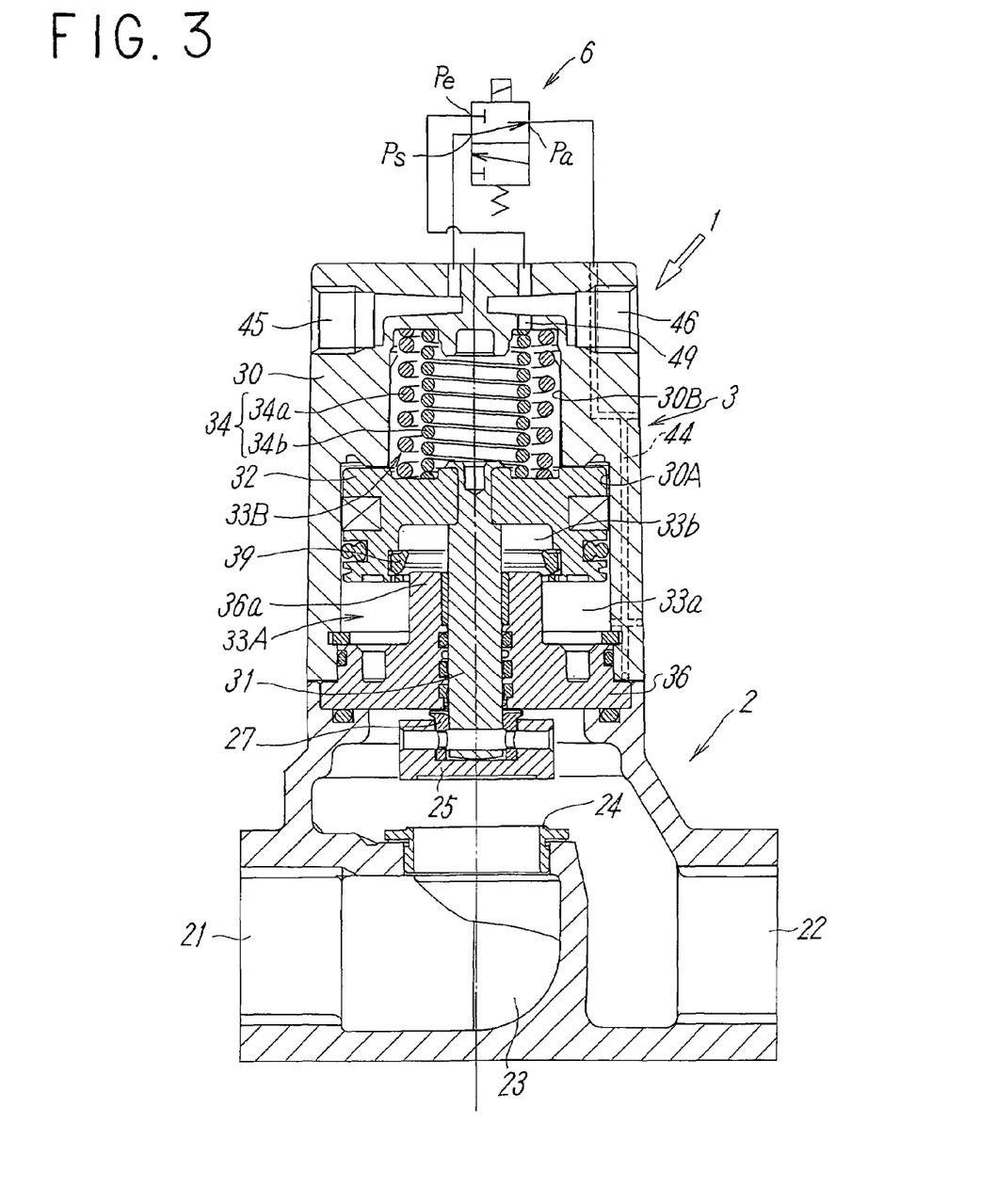
FIG. 3 is a longitudinal cross-sectional view showing a liquid flow passage opening state of the first embodiment.

FIG. 1 shows an overall structure (under a closed valve state) of a pilot-type two-port valve according to a first embodiment of the present invention. FIG. 2 is an enlarged view of a chief part shown in FIG. 1. FIG. 3 shows the first embodiment in an opened valve state.

The pilot-type two-port valve 1 comprises a water hammer preventing mechanism including a main valve mechanism 2 having a first port 21 formed on a valve body 20 to be open at one side thereof for inletting liquid, a second port 22 formed on the other side for discharging liquid, a valve seat 24 formed in midcourse of a main flow passage 23 connecting the both ports, and a valve member 25 operative to be seated on or unseated from the valve seat 24 for opening or closing the main flow passage 23, a valve drive mechanism 3 operative in response to a piston 32 connected to the valve member 25 via a rod 1 and driven by a pressure of pilot fluid for thereby opening or closing the valve member 25, and a pilot valve 6 operative to supply pilot fluid to or discharge the same from the valve drive mechanism 3. The pilot-type two-port valve 1 also includes a water hammer preventing mechanism for preventing a water hammer phenomenon resulting from the closing of the valve member 25.

The valve drive mechanism 3 includes a casing 30 that is internally formed with a circular-bore shaped cylinder section 30A slidably receiving the piston 32. The cylinder section 30A has one end serially formed with a resilient member receiving section 30B that accommodates therein a resilient member 34 composed of two coil springs 34a, 34b. Further, the cylinder section 30A has a first piston drive chamber 33A, playing a role as a pressure-acting chamber for pilot fluid to be supplied or discharged, which is formed in an area facing a first surface (bottom surface) of the piston 32. The first piston drive chamber 33A plays a role as a chamber for driving the piston 32 in a direction to unseat the valve member 25 from the valve seat 24, that is, in a direction to open the valve seat 24 in response to action of pilot fluid pressure. Accordingly, the first piston drive chamber 33A plays a role as a chamber operative such that when the piston 32 is caused to shift in a direction to allow the valve member 25 to be brought into contact with the valve seat 24 to close the same, internal fluid is discharged in a decreased volume.

Then, with a view to blocking out the first piston drive chamber 33A of the casing 30 from the main flow passage 23 inside a valve body 20 of the main valve mechanism 2, the first piston drive chamber 33A has a distal end closed by a plate 36 that is fitted to the casing 30 by means of a seal member 37. Moreover, the plate 36 is mounted in the valve body 20 of the main valve mechanism 2 via a seal member 26 for hermetically sealing effect.

On the other hand, a second piston drive chamber 33B is formed in an area facing a second surface (top surface) of the piston 32. The resilient member receiving section 30B, forming a part of the second piston drive chamber 33B, allows the resilient member 34 to be interposed between the piston 32 and an end wall of the resilient member receiving section 30B to apply an urging force to the piston 32 for the closing of the valve.

The piston 32 has central area formed with a cavity 32a that is open to the first piston drive chamber 33A and the rod 31 is fixedly secured to a center of the piston 32 so as to extend through the cavity 32a.

Further, the plate 36 has one side, facing the piston 32 via the first piston drive chamber 33A, which is formed with a columnar section 36a that is held in mating engagement with the cavity 21a of the piston 32 during valve-closing operation of the piston 32. The columnar section 36a has a center area through which an insertion bore 36b extends for insertion of the rod 31, which is sealed by a guide bush 40 and seal members 41. This allows the rod 31 to slidably move and the main flow passage 23 is afforded with liquid-tight property. A cap 27 is disposed on a mount portion of the valve member 25 with respect to the rod 31 so as to separate the seal member 41 of the plate 36 from the main flow passage 23 during valve-opening operation and plays a role as a member for protecting the seal member 41 from a secondary rapid pressure increase acting on the valve member 25.

Moreover, the piston 25 may be formed with a part corresponding to the columnar section 36a and the plate 36 may be formed with a contour corresponding to the cavity 32a.

The first piston drive chamber 33A includes a piston pressure chamber 33a located around a base portion of the columnar section 36a of the plate 36, and a damper chamber 33b defined between the cavity 32a and a leading end of the columnar section 36a of the plate 36. Also, the piston pressure chamber 33a directly communicates with a pilot flow port 43, opening at a top surface of the casing 30, through a pilot flow passage 44 extending through the casing 30 and opening at an inner peripheral surface of the cylinder section 30A. Moreover, the damper chamber 33b communicates with the piston pressure chamber 33a via a guide flow passage 38 (see FIG. 2) formed between an inner peripheral wall of the cavity 32a and an outer peripheral wall of the columnar section 36a of the plate 36.

As shown in FIG. 2, the piston 32 has an annular flange portion 32c, formed at an open end of the cavity 32a of the piston 32, which protrudes toward a center of the piston in an area round the guide flow passage 38. The cavity 32a has an inner peripheral wall formed with a ring-shaped recessed portion 32b at an area above the annular flange portion 32c for accommodating therein a one-way seal member 39.

The seal member 39, made of resilient rubber member contoured in a ring shape, is disposed in a position between the cavity 32a and the columnar section 36a and has a main body section 39a formed with a flexible lip portion 39b held in abutting contact with an outer periphery of the columnar section 36a of the plate 36 to flow a fluid from the piston pressure chamber 33a into the damper chamber 33b while having a check-valve function to block a discharge of fluid from the damper member 33b. The lip portion 39b is held in abutting contact with a circumferential periphery of the columnar section 36a in an orientation directed toward the damper chamber 33b when the piston 32 is caused to move to a position to allow the valve member 25 to come close to the valve seat 24.

Additionally, a devious flow passage 38a is formed around the main body section 39a to bypass the seal member 39 and the damper chamber 33b and the piston pressure chamber 33a communicates with each other via the devious flow passage 38a and a flow-limiting orifice 35 formed in the annular flange portion 32c.

That is, the main body section 39a has one side formed with a convex ridge portion 39c held in contact with the annular flange portion 32c. The main body section 39a has communicating portions 39d each in the form of a continuous recess, formed on an outer periphery of the main body section 39a and extending from another end face thereof opposite to the convex ridge portion 39c to an outside wall of the main body section 39a, for providing fluid communication between the damper chamber 33b and the piston pressure chamber 33a via the orifice 35 of the annular flange portion 32c. The communicating portions 39d may be formed in communication bores penetrating from the end face of the main body section 39a to a bottom end face thereof in an area adjacent to the convex ridge portion 39c.

Then, during an operation in which the pilot fluid flows into the piston pressure chamber 33a via the pilot flow passage 44, the lip portion 39b is caused to deflect due to pressure of pilot fluid to allow pilot fluid to flow from a clearance caused between the seal member 39 and the columnar member 36a into the damper chamber 33b in a manner as shown by an arrow "a" in FIG. 2. Additionally, the seal member 39 is pressed against an upper surface of the recessed portion 32b to form a clearance between the convex ridge portion 39c and the annular flange portion 32c. This allows pilot fluid to be introduced to the damper chamber 33b via clearances, including flow paths defined by communication recesses 39d, formed on the outer periphery of the main body section 39a.

Consequently, the pressure of pilot fluid acts on the piston 32 in the piston pressure chamber 33a and the damper chamber 33b, thereby moving the piston 32 in a direction to open the valve. Moreover, during the discharging of pilot fluid from the first piston drive chamber 33A, the fluid pressure inside the damper chamber 33b causes the lip portion 39b to be brought into pressured contact with the circumferential wall of the columnar section 36a while causing the convex ridge portion 39c of the seal member 39 to be brought into abutting contact with the annular flange portion 32c. Therefore, the damper chamber 33b is brought into fluid communication with the orifice 35 via the devious passage 38a formed around the seal member 39 as shown by arrows "b" and "c" in FIG. 2. This allows a flow path to be formed for gradually discharging pilot fluid from the damper chamber 33b via the orifice 35.

Accordingly, during the discharging of pilot fluid, pilot fluid under pressure is gradually discharged from the damper chamber 33b via the flow rate limiting orifice 35 to allow the piston 32 to move in damping action, thereby forming a water hammer preventing mechanism to prevent water hammer during the closing of the valve member 25.

As set forth above, while the first piston drive chamber 33A allows the pilot flow port 43, formed on the top surface of the casing 30, to supply or discharge pilot fluid through the pilot flow passage 44 of the casing 30, the pilot valve 6 may be mounted on the top surface of the casing 30 to supply or discharge pilot fluid in a manner as shown by symbol marks shown in FIGS. 1 and 3 to enable the pilot flow port 43 to be opened so as to be connected to the outlet port Pa of the pilot valve 6.

In the meanwhile, the casing 30 has an upper portion formed with a pilot inlet port 45, connected to a pilot fluid supply source, and a pilot discharge port 46 through which pilot fluid is discharged to the outside. The pilot inlet port 45 is held in fluid communication with the inlet flow port 47 that is open to the upper surface of the casing 30 in communication with an inlet port Ps of the pilot valve 6. Moreover, the discharge port 46 communicates with an outlet port 48 in communication with a discharge port Pe of the pilot valve 6 opening to the upper surface thereof. The discharge port 46 is also held in communication with a breathing port 49 of the resilient member accommodating section 30B to double as a breathing port of the resilient member accommodating section 30B.

Now, the operation of the first embodiment mentioned above is described below.

As shown in FIG. 1, when opening the main flow passage 23 with the valve in closed state wherein the valve member 25 is held in abutting contact with the valve seat 24, the pilot valve 6 is energized to cause the inlet port Ps to communicate with the outlet port Pa. This allows pilot fluid to flow into the piston pressure chamber 33a of the first piston drive chamber 33A via the pilot flow passage 44, after which pilot fluid acts on the lip portion 39b of the seal member 39 to push open the same and flows into the damper chamber 33b. Simultaneously, pilot fluid passes through the orifice 35 into the damper chamber 33b through the devious flow passage 38a. Then, pilot fluid under pressure reached the piston pressure chamber 33a and the damper chamber 33b drives the piston 32 against a spring force of the resilient member 34. This allows the rod 31 to move the valve member 25 away from the valve seat 24 to open the main flow passage 23. As a result, the various component parts of the pilot-type two-port valve 1 take various positions in positional relationships shown in FIG. 3.

When blocking the main flow passage 23 under a valve-open state shown in FIG. 3, the pilot valve 6 is de-energized to close the inlet port Ps as shown in FIG. 1 while rendering the outlet port Pa and the discharge port Pe to be brought into fluid communication with each other. Then, the pilot flow passage 44 is brought into fluid communication with the discharge port 46 via the outlet port 48 to discharge pilot fluid from the first piston drive chamber 33A causing a drop in pressure. This allows the piston 32 to be driven in a direction to close the valve due to the spring force of the resilient member 34 to cause the valve member 25 to be brought into pressured contact with the valve seat 24 to close the main flow passage 23.

During a process in which the piston 32 moves to close the valve, the damper chamber 33b and the piston pressure chamber 33a integrally lie in a continuous state on an initial stretching stage of the resilient member 34 and, hence, pilot fluid prevailing in both of these chambers are immediately discharged to drive the piston 32 at fast speed. Then, as the piston 32 travels forward to some extent to cause the valve member 25 to get close to the valve seat 24, the columnar section 36a is brought into mating engagement with an interior of the lip portion 39b of the seal member 39. This causes the seal member 39 to block a portion of the guide flow passage 38 interconnecting the damper chamber 33b and the piston pressure chamber 33a in a discharge direction. Thus, pilot fluid in the damper chamber 33b is gradually discharged through the devious flow passage 38 to the piston pressure chamber 33a via only the orifice 35. Therefore, the piston speed decreases due to increased resistance of pilot fluid in the damper chamber 33b and the valve member 25 gradually comes close to the valve seat 24 to allow the valve member 25 to gradually close the valve seat 24, whereby the main flow passage 23 is closed slowly. This results in capability of precluding the occurrence of a water hammer phenomenon resulting from liquid flow in a mass.

Figure 4:
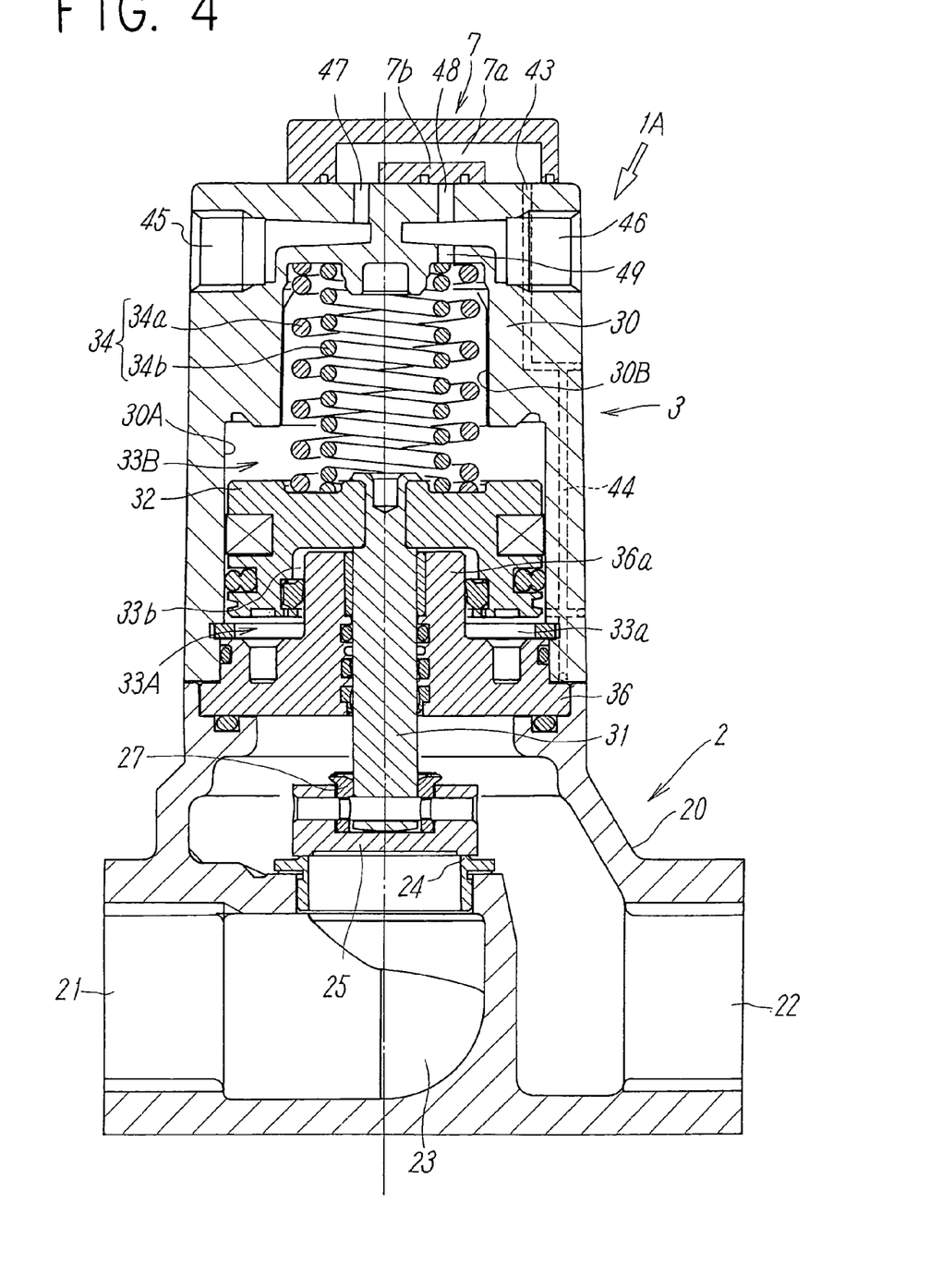
FIG. 4 is a longitudinal cross-sectional view showing a case of using a flow channel plate in place of the pilot valve of the first embodiment.
Figure 5:
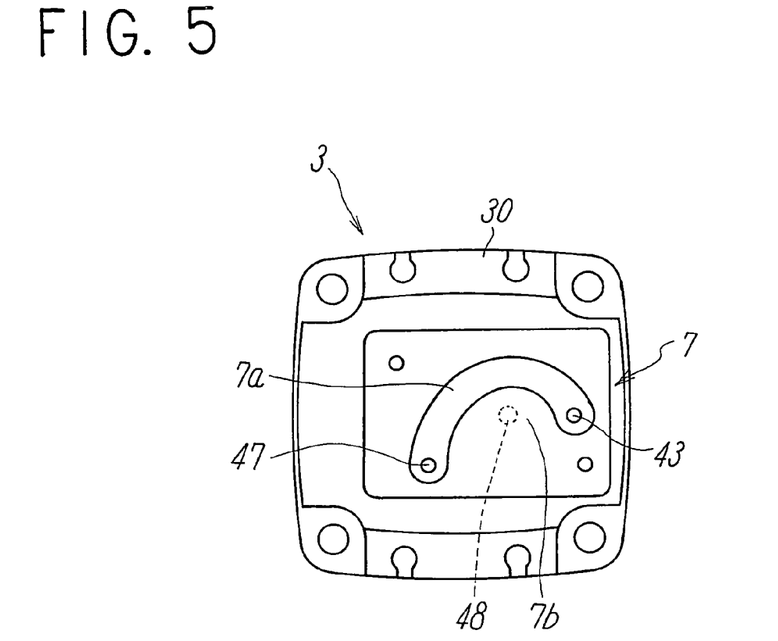
FIG. 5 is a cross-sectional view typically showing a structure of the flow channel plate shown in FIG. 4.

Now, a modified form of the first embodiment set forth above is described with reference to FIGS. 4 and 5 in connection with a case wherein a flow channel plate 7 is employed in place of the pilot valve 6.

This modified form differs from the embodiment shown in FIGS. 1 to 3 in that the pilot valve 6 is not placed on the casing 30 and the flow channel plate 7 is mounted on the casing 30 for achieving flow channel switchover between the inlet port 47 and the pilot flow port 43, both of which are opened at the upper surface of the casing 30, and does not differ from the embodiment mentioned above in respect of the main valve mechanism 2 and the valve drive mechanism 3. Thus, the same component parts bear the same reference numerals as those of the embodiment stated above and description is made with a focus on differing points.

With the two-port valve 1A, using a pilot-fluid supply and discharge means installed in an outside area allows pilot fluid to be supplied to or discharged via the pilot inlet port 45 of the valve drive mechanism 3. To this end, the flow channel plate 7 is fixedly secured onto the upper surface of the casing 30 in such a way to cause a communicating flow channel 7a, providing a fluid communication between the inlet flow port 47 and the pilot flow port 43 both opened at the upper surface of the casing 30, to bypass the outlet port 48. Further, the outlet port 48 is sealed with a seal member 7b on which a seal is disposed around the outlet port 48. Accordingly, the pilot discharge port 46 plays a role as a breath port for the resilient member accommodating section 30B due to a breath aperture 49 in communication with the discharge port 46.

With the two-port valve 1A of such a structure mentioned above, pilot fluid is introduced from an outside to the pilot inlet port 45 and passes through the inlet flow port 47, the communicating flow channel 7a and the pilot flow port 43 into the pilot flow passage 44, through which pilot fluid flows into the first piston drive chamber 33A. Further, when discharging pilot fluid, pilot fluid is discharged in flow opposite to that described above. The operation of the valve drive mechanism 3 accompanied by the supply and discharge of pilot fluid has no difference from that previously described above with reference to FIGS. 1 to 3.

As will be understood from the above, selectively mounting the pilot valve 6 or the flow channel plate 7 on the valve drive mechanism 3 of the first embodiment mentioned above enables a pilot-type two-port valve to be provided.

Figure 6:
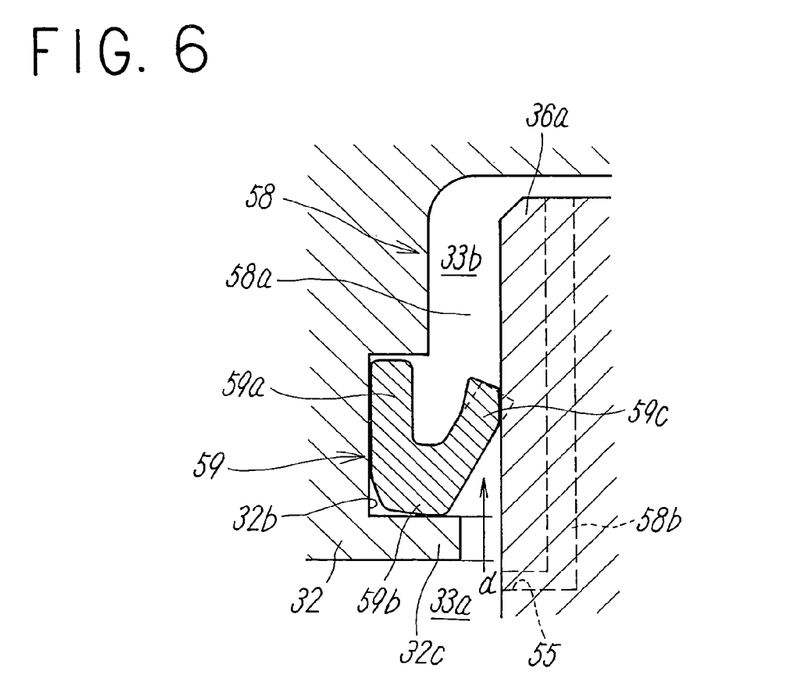
FIG. 6 is a longitudinal cross-sectional view of a chief part of a pilot-type two-port valve of a second embodiment according to the present invention.

FIG. 6 shows a second embodiment of the present invention in cross-sectional view corresponding to FIG. 2 of the first embodiment in connection to a structural part different from the first embodiment discussed above. The second embodiment differs from the first embodiment in respect of component parts of the piston pressure chamber 33a and the damper chamber 33b and the guide flow passage, through which these chambers communicate with each other, and description is given below with a focus on structures of differing parts with the same component parts bearing the same reference numerals as those of the first embodiment to omit redundant description.

With the second embodiment, a guide flow passage 58 is comprised of an opening and closing flow passage 58a, in which a one-way seal member 59 is disposed, and a devious flow passage 58b formed in the columnar section 36a of the plate 36 so as to bypass the flow passage 58a. The devious flow passage 58b has an outlet provided with an orifice 55 for limiting the flow rate of fluid. The seal member 59, made of resilient rubber material and formed in a ring shape with a V-shape configuration in cross section, includes an outer wall 59a held in tight contact with the inner peripheral wall of the recessed portion 32b of the piston 32, a base portion 59b held in tight contact with the annular flange portion 32c of the piston 32, and a lip portion 59c obliquely extending from the base portion 59b toward a circumferential periphery of the columnar section 36a of the plate 36.

The devious flow channel 58b, provided with the orifice 55, is formed in the columnar section 36a at an arbitrary position thereof so as to bypass the seal member 59 and serves to allow the damper chamber 33b and the piston pressure chamber 33a to communicate with each other via the orifice 55.

During flow of pilot fluid admitted to the damper chamber 33b through the guide flow passage 58 mentioned above, the lip portion 59c of the seal member 59 is caused to deform due to a pressure of pilot fluid to allow pilot fluid to flow through a flow path defined between the lip portion 59c and the columnar section 36a as shown by an arrow "d" in FIG. 6. Simultaneously, pilot fluid flows through the orifice 55. On the contrary, when discharging pilot fluid from the damper chamber 33b, the lip portion 59c of the seal member 59 blocks off the flow path between the lip portion 59c and the columnar section 36a in a fluid discharge direction. Thus, pilot fluid flows only through the orifice 55 thereby gradually discharging pilot fluid.

The operation of the pilot-type two-port valve of the second embodiment does not substantial differs from that of the first embodiment except for the points described above and, hence, a description of the same is herein omitted.

Next, description is made of a pilot-type two-port valve according to a third embodiment of the present invention with reference to FIGS. 7 to 10.

Figure 7:
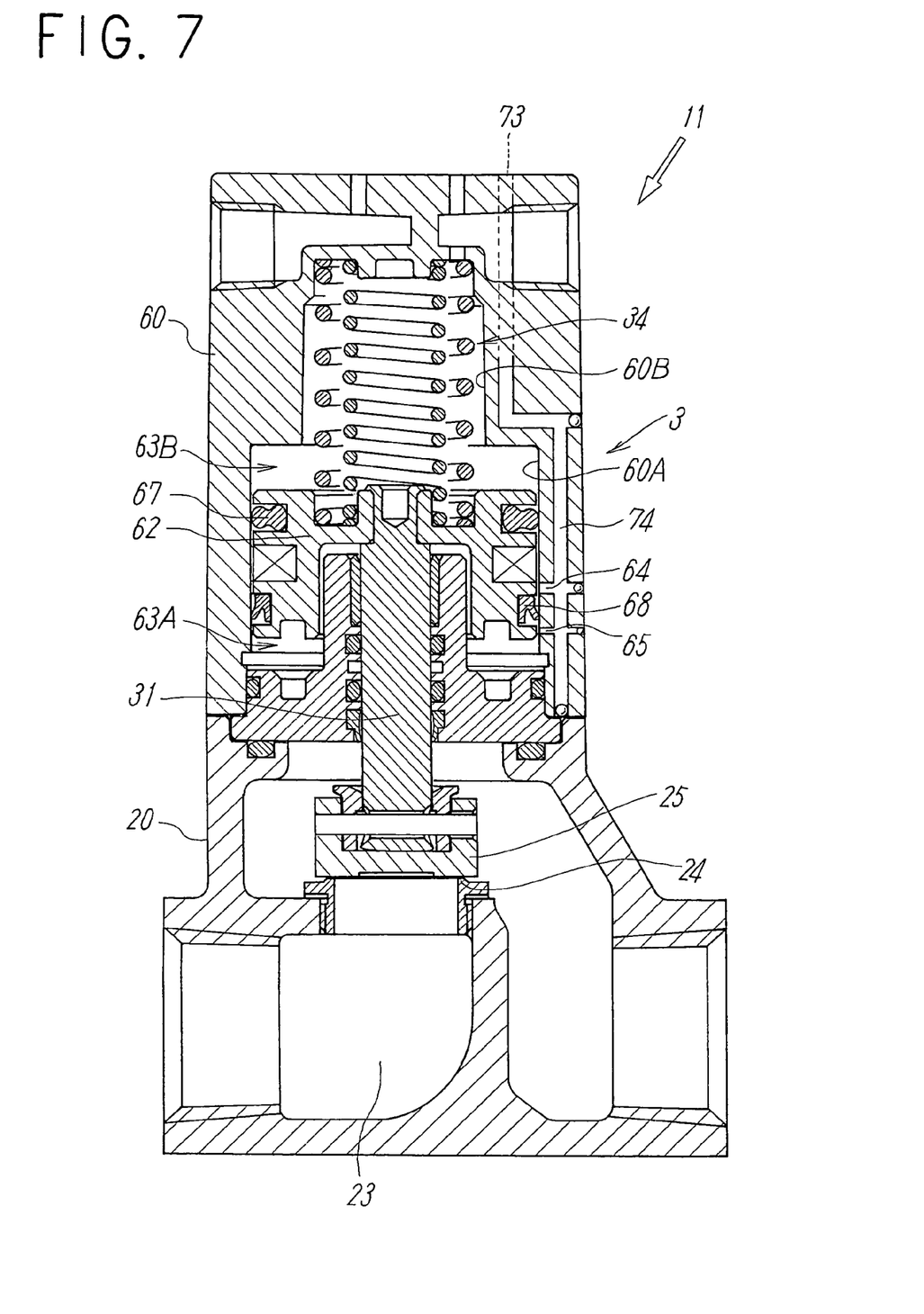
FIG. 7 is a longitudinal cross-sectional view of a pilot-type two-port valve of a third embodiment according to the present invention.

The two-port valve of the third embodiment differs from the second and third embodiments in the valve drive mechanism 3 in respect of the means for limiting a discharge speed of pilot fluid for the closing of a valve in proportion to a supply speed of pilot fluid for the opening of the valve and no difference exists in other structures. Therefore, description is made with a focus on the above different points while the same component parts bear the same reference numerals as those of the first embodiment and description of the same is herein omitted.

Further, although the pilot valve 6 and the flow channel plate 7 can be selectively utilized, description and illustration of these component parts are herein omitted.

A two-port valve 11 of the third embodiment, shown in FIG. 7, has the main valve mechanism 2 that is not substantially different from that of the first embodiment. In contrast, the valve drive mechanism 3 is arranged in such a way to allow a piston 62 to be slidably inserted to a cylinder section 60A of a casing 60. A first piston drive chamber 63A, to which pilot fluid is supplied or from which pilot fluid is discharged for driving the piston, is constituted to have a single chamber structure with no division between the piston pressure chamber and the damper chamber as done in the first embodiment. Thus, supplying pilot fluid into and discharging the same from an inside of the first piston drive chamber 63A enables the piston 62 to be driven. A resilient member 34 is disposed in a second piston drive chamber 63B.

Pilot fluid is supplied to and discharged from the first piston drive chamber 63A through a pilot flow passage 74 extending from a pilot flow port 73 opened at a top surface of the casing 60 to pass through the casing 60 and opening at a circumferential periphery of the cylinder section 60A. The pilot flow passage 74 and an inside of the cylinder section 60A communicates with each other through a plurality of flow port 64, 65, opened at different positions along a direction in which the piston 62 moves, in a manner described later. One of these flow ports plays a role as a flow-limiting orifice 65. Accordingly, "the orifice 65" is the same as "the flow port 65" in the following description.

The piston 62 has a circumferential wall, which carries thereon a seal member 67 for enabling the piston 62 to slidably move under a hermetic condition, and is urged in a valve-closing direction due to the resilient member 34 disposed inside a resilient member accommodating section 60B. Moreover, the circumferential periphery of the piston 62 is formed with a ring-shaped recess at an area closer to the first piston drive chamber 63A to receive a one-way seal member 68 composed of a V-type packing. The seal member 68 is mounted so as to block the fluid flow from the first piston drive chamber 63A but to admit the flow of fluid directed in an opposite direction.

The position for the flow port 64 to be opened is determined such that when the piston 62 assumes a fully-opened valve position, that is, when the valve member 25 is unseated to fully open the valve seat 24, the flow port 64 is held in direct communication with the first piston drive chamber 63A and that when the piston 62 is driven from such a condition in a valve-closing direction and the valve member 25 gets close to the valve seat 24 to some extent, the seal member 68 passes over the flow port 64 that is consequently intervened between the seal member 68 and the seal member 67. When this takes place, the seal member 68 shuts off the flow port 64 and the first piston drive chamber 63A from each other to prevent fluid from flowing in a discharge direction. That is, the seal member 68 permits pilot fluid to be admitted to the first piston drive chamber 63A but blocks the discharging of the same.

Further, the orifice 65 is formed at the position so as to communicate with the first piston drive chamber 63A at all times regardless of the moving position of the piston 62. These structures result in the formation of a water hammer preventing mechanism.

With the two-port valve 11 of the third embodiment, when opening the main flow passage 23 remaining under a valve-closed state shown in FIG. 7, pilot fluid is supplied through the pilot flow port 73, which is opened at the top surface of the casing 60, and the pilot flow passage 74 in the same manner as that in which pilot fluid is supplied in the first embodiment. This pilot fluid flows into the cylinder section 60A via the flow port 64 to push open the seal member 68 and then flows into the first piston drive chamber 63A. Concurrently, pilot fluid passes through the pilot follow passage 74 and directly flows into the first piston drive chamber 63A via the orifice 65. This allows the piston 62 to be driven in the valve-opening direction against a spring force of the resilient member 34, thereby opening the main flow passage 23. During the maximum driving operation of the piston 2, the seal member 68 assumes a position passing over the flow port 64.

When blocking the main flow passage 23 from the valve-opened state, the supply of pilot fluid is interrupted and pilot fluid is discharged from the first piston drive chamber 63A. Therefore, the piston 62 begins to move in the valve-closing direction due to the urging force of the resilient member 34 inside the second piston drive chamber 63B. Pilot fluid is discharged from the first piston drive chamber 63A to the pilot flow passage 74 via the flow port 64 and the orifice 65 on an initial stage to cause the piston 62 to rapidly move. As the seal member 68 of the piston 62 passes over the flow port 64 during transitional movement, the seal member 68 blocks the flow of pilot fluid directed toward the flow port 64 to prevent pilot fluid from flowing through the flow port 64. Thereafter, pilot fluid, remaining inside the first piston drive chamber 63A, is discharged to the pilot fluid passage 74 through the orifice 65 at the limited flow rate. Thus, the piston 62 is caused to decelerate and the valve member 25 is gradually brought into pressured contact with the valve seat 24. As a result, the main flow passage 23 is closed slowly with no occurrence of water hammer effect resulting from the closing of the valve.

With the third embodiment set forth above, while the orifice 65 has a fixed opening surface area with no capability of regulating the discharge flow rate of pilot fluid, a needle valve 70 may be incorporated to enable the adjustment of the opening surface area of the orifice, that is, the discharge flow rate of pilot fluid.

Figure 8:
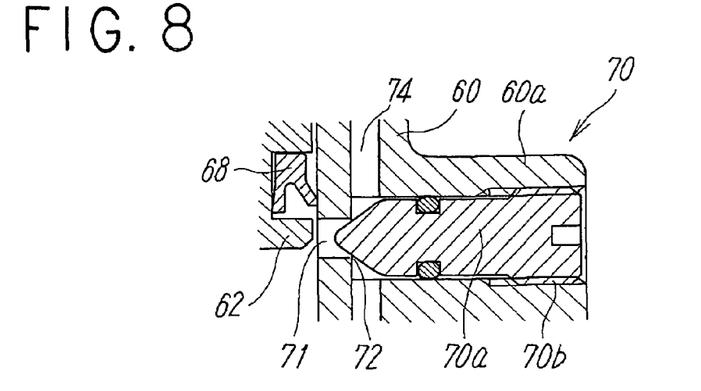
FIG. 8 is a cross-sectional view of a chief part showing a structural example of a modified form of a part of the third embodiment according to the present invention.

FIG. 8 shows a first modified form of such a structure wherein a flow rate adjusting mechanism is added. In particular, an orifice 71 is located in a position corresponding to the orifice 65 of the third embodiment, mentioned above, and the casing 60 has an outer periphery formed with a protruding valve holder 60a at a position corresponding to the orifice 71. A valve seat 72 is formed around the orifice 71 and a needle 70a is screwed into a threaded portion 70b of the valve holder 60a in opposition to the valve seat 72 for positional adjusting capability.

Figure 9:
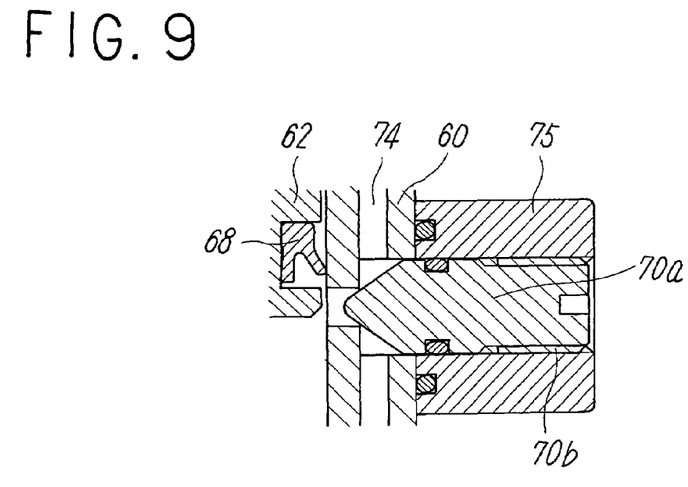
FIG. 9 is a cross-sectional view of a chief part showing a partially structural example of a part of the third embodiment different from that of FIG. 8.
Figure 10:
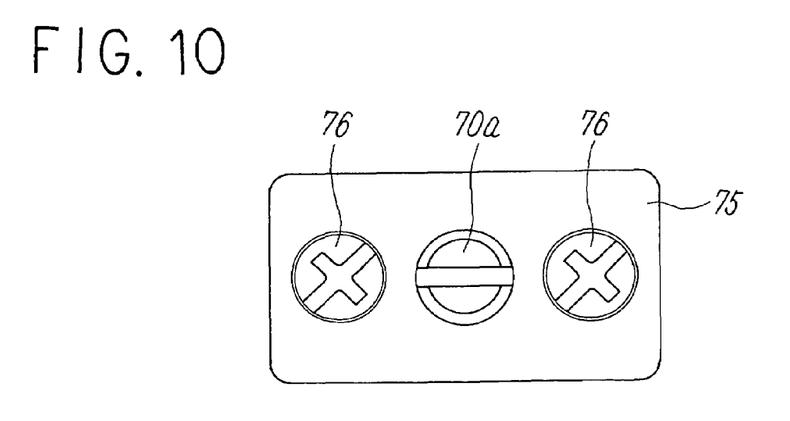
FIG. 10 is a front view of a structural example of FIG. 9.

Further, FIGS. 9 and 10 shows a second modified form of the flow rate adjusting mechanism described above. With the first modified form shown in FIG. 8, the valve holder 60a, to which the needle 70a is screwed, is integrally formed with the casing 60. With a second structural example, a valve holder member 75 is formed separately from the casing 60 and has the threaded portion 70b to which the needle 70a is screwed in positional adjusting capability, with the valve holder member 75 being fixedly secured to the casing 60 by means of screws 76.

With the first to third embodiments set forth above, in anyway, while the resilient member is disposed in the second piston drive chamber for restoring the piston in the valve-closing position, this resilient member may be dispensed with or additionally combined with a structure arranged to allow pilot fluid to be supplied to or discharged from the second piston drive chamber.

Furthermore, while any of the first to third embodiments employs a so-called NC (normally closed) valve including the valve member 25 that remains closed due to the urging force of the resilient member during a normal state, the present invention is not limited to such an NC valve and may utilize a so-called NO (normally opened) valve including the valve member 25 that remains opened during the normal state.

The NO valve can be implemented by slightly modifying the first to the third embodiments. That is, the second piston drive chambers 33B, 63B are connected to the pilot flow passages 44, 74 as pressure-acting chambers and the resilient member 34 is disposed in the first piston drive chambers 33A, 63A for restoring purposes whereby moving the pistons 32, 62 allows the breath flow passage to be opened to the outside for taking in an atmospheric air to the first piston drive chambers 33A, 63A for discharging the atmospheric air therefrom.

In the meanwhile, the first piston drive chambers 33A, 63A may incorporate the same water hammer preventing mechanisms as those of the first to third embodiments to allow the orifice to limit the flow rate of discharge fluid flowing through the breath flow passage mentioned above.

The invention claimed is:

1. In a pilot-type two-port valve having a main valve mechanism including a first port and a second port serving as an inlet and an outlet for liquid, respectively, a valve seat formed in midstream of a main flow passage connected between both the ports, and a valve member operative to open or close the valve seat; and a valve drive mechanism including a piston, connected to the valve member via a rod, and first and second piston drive chambers formed on both sides of the pistons and operative such that supplying pilot fluid to or discharging the same from at least one of the first and second piston drive chambers allows the piston to operate for thereby opening or closing the valve member:

the two-port valve comprising a water hammer preventing mechanism, operative to prevent the occurrence of water hammer resulting from the valve member closing the valve seat, which has an orifice formed in the first piston drive chamber, from which fluid is discharged when the piston drives the valve member in a direction to close a valve, for limiting the flow rate of discharge fluid whereby when the valve member comes close to the valve set, the flow rate of the discharge fluid is restricted to the flow rate of fluid admitted through the orifice and, wherein the water hammer preventing mechanism comprises a one-way seal member mounted on the piston and operative such that when the piston moves to a position to allow the valve member to get close to the valve seat, the seal member blocks a portion of a flow path for the discharge fluid in a discharge direction to cause the discharge fluid to be discharged under a status where the flow rate of the discharge fluid is restricted.

2. The pilot-type two-port valve according to claim 1, wherein the piston has a damper chamber in fluid communication with the first piston drive chamber via a seal member and the orifice whereby when the piston moves to the position to allow the valve member to get close to the valve seat, the damper chamber is shut off from the first piston drive chamber due to the seal member and brought into fluid communication with the first piston drive chamber via the orifice.

3. The pilot-type two-port valve according to claim 1, wherein the piston has a damper chamber in fluid communication with the first piston drive chamber via seal member and the orifice and the damper chamber has an inner periphery on which the seal member, which is annular in shape, is disposed, and wherein a plate, blocking out one end of the first piston drive chamber, includes a columnar section operative to mate with the seal member, whereby when the piston moves to the position to allow the valve member to get close to the valve seat, the columnar section is brought into mating engagement with the seal member to cause the damper chamber to be shut off from the first piston drive chamber due to the seal member and brought into fluid communication with the first piston drive chamber via the orifice.

4. The pilot-type two-port valve according to claim 3, wherein the piston has an area formed with the orifice for bypassing the seal member to allow the damper chamber and the first piston drive chamber to communicate with each other.

5. The pilot-type two-port valve according to claim 3, wherein the columnar section has an area formed with the orifice for bypassing the seal member to allow the damper chamber and the first piston drive chamber to communicate with each other.

6. The pilot-type two-port valve according to claim 1, wherein the piston has an outer periphery carrying thereon the seal member and the first piston drive chamber has a sidewall having a plurality of areas formed with flow ports, operative to discharge fluid from the first piston drive chamber to an outside, one of which includes the orifice whereby when the piston moves to the position to allow the valve member to get close to the valve seat, the seal member shuts off the flow ports, except for the orifice, in the discharge direction.

7. The pilot-type two-port valve according to claim 1, wherein the first piston drive chamber comprises a pressure chamber that is supplied with pilot fluid to drive the piston in a valve-opening direction and the second piston drive chamber accommodates therein a resilient member for restoring the piston to a valve closing position.

8. The pilot-type two-port valve according to claim 3, wherein the first piston drive chamber comprises a pressure chamber that is supplied with pilot fluid to drive the piston in a valve-opening direction and the second piston drive chamber accommodates therein a resilient member for restoring the piston to a valve closing position.

9. The pilot-type two-port valve according to claim 6, wherein the first piston drive chamber comprises a pressure chamber that is supplied with pilot fluid via the flow ports to drive the piston in a valve-opening direction and the second piston drive chamber accommodates therein a resilient member for restoring the piston to a valve closing position.

* * * * *